Patented Dec. 29, 1953

2,664,344

UNITED STATES PATENT OFFICE 2,664,344

PROCESS FOR STABILIZING RED PHOSPHORUS AGAINST OXIDATION

George F. Nordblom, Philadelphia, Pa., and Martin S. Silverstein, Camden, N. J.

No Drawing. Application January 27, 1944, Serial No. 519,950

5 Claims. (Cl. 23—223)

(Granted under Title 35, U. S. Code (1952), sec. 266)

The invention described herein may be manufactured and used by or for the Government for governmental purposes, without the payment to us of any royalty thereon.

The present invention relates to a process for preparing red phosphorus which is more resistant to oxidation than red phosphorus heretofore appearing on the market, and to compositions comprising said prepared red phosphorus. The process and compositions to which the invention relates are linked to others which are disclosed in the following co-pending applications: Silverstein 519,949; Nordblom 582,479, now Patent No. 2,636,811, dated April 28, 1953; Nordblom-Silverstein 582,480; and Silverstein 582,481.

Red phosphorus prepared according to the present invention has distinct utility in the preparation of inflammable compositions for military and non-military purposes. Red phosphorus prepared according to the present invention is highly useful in the preparation of primer compositions for initiating the explosion of explosives, in pyrotechnic compositions, in incendiary compositons, in smoke producing compositions, in match head compositions, in compositions for striking surfaces for safety matches, and for other purposes.

Red phosphorus of commerce can be used for some purpose without serious or objectionable consequences arising from its partial oxidation. However, the partial oxidation of red phosphorus may be objectionable, or a disadvantage, in other uses. Therefore, a process for preparing red phosphorus which is enhanced or increased in resistance to oxidation is of considerable utility.

In utilizing red phosphorus in the preparation of primer compositions for use in the primer cups of primers for small arms ammunition, it is highly desirable to use red phosphorus which is as highly resistant as possible to oxidation, since if the red phosphorus in the composition suffers too much oxidation either from atmospheric influences or from the influence of other chemical agents in the primer or primer composition, hang fires and loss in sensitivity result. In general, red phosphorus which does not possess good resistance to oxidation, when used in primer compositions, results in poor storage stability or keeping qualities.

In the production of incendiary, pyrotechnic, and smoke producing compositions, it is also desirable and of advantage to use forms of red phosphorus that are resistant as much as possible to oxidation, in the interest of good storage stability or keeping qualities.

The importance of being able to prepare easily and efficiently red phosphorus in a form which possesses high resistance to oxidation will be readily appreciated when it is considered that primer compositions, incendiary compositions, pyrotechnic compositions and smoke producing compositions containing red phosphorus also contain solid oxidizing agents in intimate admixture therewith, so that the red phosphorus is not only subject to the oxidizing influences of the oxygen and moisture of the atmosphere but also to the oxidizing influences of the said solid oxidizing agents.

Analyses of many samples of pulverulent red phosphorus sold on the market, and from various sources of supply, have revealed that they all contained compounds of iron and compounds of other metals, for example, copper. These compounds were present in comparatively small amounts, and their amounts varied. Iron compounds, for example, were found to be present in amounts which varied roughly from 200 to 700 parts of iron (calculated as Fe) per million parts of substantially dry pulverulent red phosphorus.

We have discovered that the above-mentioned metallic compounds in the pulverulent red phosphorus of commerce act to catalyze or accelerate its rate of oxidation, and that the compounds of iron are much more active as catalysts or accelerators of oxidation of red phosphorus than the compounds of other metals usually found in the said phosphorus. While the above-mentioned proportions of iron, namely 200 to 700 parts of iron per million parts of red phosphorus, are, mathematically speaking, not very great, yet this proportion is operatively great when considered with reference to the stability and keeping qualities of the red phosphorus and of the various compositions of matter referred to above.

It is among the objects of the present invention to provide a process for quickly and effectively lowering the iron compound content and other metal content of pulverulent red phosphorus containing said compounds. The extent of removal of these compounds depends upon the temperature of treatment and duration of the agitation employed in the practice of the process, of which various modifications are described in the examples hereinafter given. Utilizing pulverulent red phosphorus with an iron content of 200 parts of iron per million parts of red phosphorus as starting material, the present process is capable of lowering the iron content quickly to values below 60 parts of iron per million parts of red phosphorus; and when the process is applied under suitable conditions of temperature and of agitation, the process quickly yields substantially dry pulverulent red phosphorus in which the iron content is less than 10 parts of iron per million parts of red phosphorus.

Another of the objects of the present invention is to provide a process for preparing red phosphorus, or pulverulent red phosphorus, which is free, or substantially free of iron compounds, or at any event red phosphorus in which the presence of iron compounds is less than five parts of iron (calculated as Fe) per million parts of substantially dry pulverulent red phosphorus, for example, one part, or less, of iron per million parts of red phosphorus. Starting with pulverulent red phosphorus of commerce containing from 200 to 300 parts of iron per million parts of red phosphorus, the process according to the present invention is capable of lowering the iron content quickly to less than five parts of iron per million parts of red phosphorus. The extent to which the iron content is lowered below five parts of iron per million parts of red phosphorus depends upon the duration of the agitation and the temperature of treatment employed in the process which is described in detail in the specific examples given below. In general, the longer the agitation and the higher the temperature of treatment the greater is the lowering of the iron content.

A further object of the present invention is the production of ammunition primer compositions, incendiary compositions, pyrotechnic compositions, smoke producing compositions, and inflammable compositions in general, comprising as ingredients a solid oxidizing agent for red phosphorus, and red phosphorus, or pulverulent red phosphorus, which is free, or substantially free of iron compounds, or which contains less than five parts of iron (calculated as Fe) per million parts of substantially dry red phosphorus.

Still another object of the present invention is the production of inflammable compositions comprising a solid oxidizing agent for red phosphorus, and red phosphorus which is free or substantially free of metallic substances or metal compounds which act to catalyze or accelerate its rate of oxidation. By "free or substantially free of metallic substances or metal compounds which act to catalyze or accelerate the oxidation of red phosphorus" is meant at least that degree of freedom from said substances or compounds which is attainable by treating red phosphorus according to Example 1(f) below with the particle sizes of the red phosphorus ranging from 10 microns in diameter to 130 microns in diameter, as starting material for the said treatment.

While the iron content of red phosphorus of commerce has been mentioned above as the most objectionable of the catalysts or accelerators of oxidation thereof, and its removal or lowering by the process of the present invention referred to, it is not to be inferred from this that the process does not effect removal of other metallic compounds from the red phosphorus, since we have found notable reduction in copper content and other metal content. Therefore, while reference to removal or lowering of iron content may be referred to herein, it is to be understood that the concomitant removal of other metallic materials or compounds is not excluded, whether or not such other materials or compounds be oxidation catalysts or accelerators.

In general, the present process of increasing or enhancing the resistance of red phosphorus, containing iron and/or other catalyst or accelerators of oxidation, consists in agitating the said red phosphorus with an aqueous solution of an acid having the property of removing iron from the red phosphorus, thereafter washing the red phosphorus with water or other suitable solvent for removing aqueous solution of said acid from the red phosphorus, and thereafter drying the red phosphorus. Among the acids that may be used are mentioned the strong mineral acids, e. g., sulphuric acid, hydrochloric acid, nitric acid, phosphorous acid and phosphoric acid, and mixtures thereof. The above agitation may be performed while the materials being agitated are at room temperature (20 to 25° C.), above room temperature or at boiling temperature. When the boiling temperature is employed, the boiling of the aqueous acid usually provides sufficient agitation, although supplemental agitation may be employed. In general, agitation while the materials are hot, or at the boiling point of the aqueous acid, is preferred.

Instead of employing in the beginning an acid as above described, there may be employed a chemical compound which upon reaction with red phosphorus yields the acid. Thus, for example, an aqueous solution of hydrogen peroxide may be used. The hydrogen peroxide reacts chemically with the red phosphorus with which it is agitated, and converts a small part of the red phosphorus into acids of phosphorus, for example, phosphorous or phosphoric acid or both.

Red phosphorus usually appears on the market in the form of a pulverulent dark red mass, containing various particle sizes. In the examples hereinafter given, the red phosphorus in this condition is used as the starting material, although it may be preliminarily screened to remove exceptionally large particles of red phosphorus and of foreign material. The particle size of the pulverulent red phosphorus of commerce may range from less than 10 microns to 180 microns in diameter, with most of the particles ranging from 20 to 60 microns, inclusive, in diameter. It is not unusual to find specimens on the market having 70 to 80 percent by weight of particles having diameters from 20 to 60 microns inclusive, with particle sizes above and below this range.

In certain instances where it is desirable to secure the utmost in resistance of red phosphorus to oxidation, as for example, when the red phosphorus is to be used in the preparation of ammunition primer composition, it is advantageous to remove the particles of red phosphorus which are less than 10 microns in diameter. This separation may be accomplished in any suitable manner, for example, by flotation or sedimentation processes. This removal of particles of red phosphorus of less than 10 microns in diameter may be performed before the red phosphorus is agitated with the acid, as described below in the specific examples given, or the separation may be accomplished after the said acid treatment, before the washing described; or the separation of said particles may be accomplished during or after the washing but before the final drying of the red phosphorus.

The following examples are given as illustrative of ways in which, according to the invention, red phosphorus of commerce, or found on the market, can be made more resistant to oxidation.

EXAMPLES I(a) TO I(n)

I(a)

Commercial red phosphorus of low resistance to oxidation, and in powder form, is mixed with a 5% water solution of sulphuric acid in the ratio of 100 grams of phosphorus to 500 milliliters of the acid solution. This mixture of red phosphorus and acid is placed in a beaker of at least three times the volume of liquid in the case of small amounts of red phosphorus, in order to allow sufficient room for a slight tendency to froth during boiling, and then boiled. The mixture is advantageously heated with a Bunsen burner, since this form of heating enables easy control of the boiling rate. The time of treatment of the red phosphorus with the acid is measured from the time the mixture begins to boil. The boiling of the mixture is continued for fifteen minutes. The mixture is then diluted to twice its volume with cold water, filtered and washed with water on the filter until free or substantially free of acidic substances. The washed and filtered red phosphorus is then dried at a temperature of 60° C. in a vacuum oven under a pressure of 29 to 29.5 inches of mercury below atmospheric pressure. The phosphorus so prepared is more stable in warm moist air at atmospheric pressure, in hot moist oxygen under superatmospheric pressure, and in explosive compositions and in primer compositions containing oxidizing agents, than the red phosphorus used as starting material. During the above described boiling, particularly where the volume of acid is relatively small, the evaporation of water may be compensated by addition of water to keep the volume constant during boiling.

*I(b)*

The procedure is the same as in Example I(a) except that the 5% sulphuric acid is employed in contact with the red phosphorus at room temperature (20° to 25° C.) instead of at the boiling temperature, and the mixture of red phosphorus and acid is mechanically stirred for fifteen minutes. The gain in stability or resistance to oxidation of the red phosphorus is not as great as in Example I(a). Generally, treatment at higher temperatures gives greater stability than treatment at lower temperatures.

*I(c)*

The procedure in this example is the same as in Example I(b) except that instead of the 5% sulphuric acid solution 5% water solutions of hydrochloric acid, nitric acid and phosphoric acid are respectively employed at room temperatures (20° to 25° C.). The strong acids in this example give nearly identical results in this example, whereas the phosphoric acid, a relatively weak acid, gives a product which was somewhat inferior to the others as regards stability characteristics.

*I(d)*

The procedure in this example is the same as in I(a) except that instead of the 5% sulphuric acid, 5% water solutions of hydrochloric acid and phosphoric acid are respectively employed. In general, in this example, the stability characteristics of the red phosphorus obtained by using phosphoric acid are not as good as when using sulphuric acid and hydrochloric acid, which are stronger acids than phosphoric acid.

*I(e)*

The procedure in this example is the same as in I(a) except that instead of the 5% sulphuric acid solution, 2.5% and 10% water solutions of sulphuric acid are respectively employed. While the use of 2.5%, 5% and 10% sulphuric acid according to this example and Example I(a) results in improved stability characteristics of the red phosphorus, the stability seems to increase only slightly as the concentration of the acid increases.

*I(f)*

The procedure in this example is the same as in Example I(a) except that instead of conducting the boiling with the 5% sulphuric acid for fifteen minutes only, the boiling is continued for four hours. This longer period of boiling results in greater stability of the treated phosphorus. Boiling for more than four hours does not add greatly to the stability of the red phosphorus.

*I(g)*

The procedure in this example is the same as in Example I(a) except that a succession of three acid treatments with the boiling 5% sulphuric acid is used. Each of these three successive treatments is followed by washing and drying as described in Example I(a). The stability of the resulting red phosphorus product increases with the number of acid treatments applied.

*I(h)*

The procedure in this example is the same as in Example I(a) except that the time of duration of treatment with the 5% sulphuric acid at the boiling point is from one-half to sixteen hours, for example, for one-half hour, 2 hours, 8 hours, 12 hours and 16 hours. The stability of the treated red phosphorus appears to increase greatly as the time or duration of treatment increases. However, after 8 hours of treatment, doubling the duration of the treatment only leads to increase in stability of the order of magnitude of 10%.

*I(i)*

The procedure according to this example is the same as in Example I(a) except that instead of using red phosphorus to acid solution in the ratio of 1:5 as mentioned in said example, and boiling for 15 minutes, a four hour period of boiling with 5% water solution of sulphuric acid is used with phosphorus to acid ratios of 1 gm.:2.5 ml. and 1 gm.:20 ml. respectively. The stability of the acid treated phosphorus appears to be practically independent of the phosphorus to acid ratio over a wide range.

*I(j)*

The procedure of this example is the same as in Example I(a) except instead of operating at the boiling point and for fifteen minutes, the temperature is 70° C. and the duration of treatment one and one-half hours. The mixture at 70° C. is mechanically agitated to ensure good mixing during treatment. The stability of the product produced by this example is a little less than the stability of the product produced according to Example I(k) below.

*I(k)*

The procedure of this example is the same as Example I(a) except instead of using 5% sulphuric acid and 15 minutes of treatment at the boiling temperature, 10% water solution of sulphuric acid at 70° C. for one and one-half hours is employed with continuous agitation of the mixture.

The product obtained according to this example has a stability very nearly that obtained according to the eight hour treatment of Example I(h).

*I(l)*

The procedure of this example is the same as in Example I(a) except that instead of the 5% sulphuric acid and the 15 minute duration of treatment, 10% sulphuric acid for 8 hours at the boiling point is employed. The stability of the product produced by this example appears to be about the same as the product produced according to the eight hour treatment of Example I(h).

*I(m)*

The procedure of this example is the same as in each of the preceding examples except that the red phosphorus, prior to the treatment with the acid of the preceding examples, is agitated or stirred in a 4 to 20% water solution of sodium or potassium hydroxide from 30 minutes to 6 hours at 70 to 96° C., preferably at 75° C., for a period of 30 minutes to 2 hours, advantageously for one hour. For this pretreatment with alkali, the red phosphorus and alkali solution are employed in the ratio of 100 grams of red phosphorus starting material to 500 milliliters of alkali solution. After the red phosphorus has been subjected to the alkali solution for the time stated, the mixture of alkali solution and red phosphorus is diluted with water to five times its volume, and the red phosphorus allowed to settle. The supernatant liquid is poured off and the sediment of red phosphorus is transferred to a suction filter where it is filtered and washed with water until neutral to methyl red indicator. The red phosphorus so pretreated with alkali is then subjected to any one of the acid treatments described above. In most cases, these treatments with alkali for short periods of time gave red phosphorus which responded more favorably to the acid treatments described than when such alkali treatments are omitted.

*I(n)*

The acid treated red phosphorus obtained according to Examples I(a) to (m) inclusive, after washing with water to free it of acid, but prior to final drying, is sedimented in water, or subjected to a separation in water, to remove red phosphorus particles less than 10 microns in diameter. After this separation of particles, the particles of 10 microns and more in diameter constituting the portion desired, are dried at 60° C. in a vacuum oven as in Example I(a).

EXAMPLE II(a) TO II(d)

*II(a)*

According to this example, pulverulent red phosphorus of commerce is treated respectively with 1.0 and 2.0% water solutions of hydrogen peroxide. The ratio of red phosphorus to hydrogen peroxide solution used is 1 gram of red phosphorus to 5 milliliters of hydrogen peroxide solution. The time of agitation of the red phosphorus with the water solution of hydrogen peroxide is ¼ to ½ hour at the boiling point of the mixture. Thereafter, the red phosphorus is washed, filtered and dried as in Example I(a). The resistance to oxidation of the products obtained according to this example compares favorably with the products obtained according to Examples I(a) to I(n).

*II(b)*

The procedure of this example is the same as in Example II(a) except that instead of using a one percent solution of hydrogen peroxide in water, a one percent solution of hydrogen peroxide in a 5 percent solution of sulphuric acid is employed. The product of this example is somewhat more stable or resistant to oxidation than the product obtained according to Example II(a).

*II(c)*

Pulverulent red phosphorus of commerce is treated with a 2% water solution of hydrogen peroxide as in Example II(a) for ¼ hour, whereupon it is treated with a 5% water solution of sulphuric acid for ½ hour as described in Example I(a), followed by washing and drying as in I(a). The product obtained appears to be more resistant to oxidation than when the acid alone is used.

*II(d)*

The procedure of this example is the same as in Example II(c) except that the order of treatment with the hydrogen peroxide and acid solutions is reversed. The products obtained according to this example have more or less the same resistance to oxidation as the products obtained according to Example II(c).

EXAMPLE III

Finely divided dried red phosphorus which has been prepared according to Examples I(a) to I(n) and II(a) to II(d) inclusive, is intimately mixed with an oxidizing agent, for example, barium nitrate or barium peroxide to form a priming composition, or such a composition may be formed of a ternary mixture instead of a binary mixture. As an example of a ternary mixture of a primer composition may be mentioned a mixture of the treated red phosphorus, barium nitrate, as the oxidizing agent, and a metallic fuel, for example, powdered antimony sulphide or powdered metal, for example, powdered zirconium. The proportions of treated red phosphorus and oxidizing agent in the mixture may vary within wide limits. The primers and primer compositions may be prepared as described in Prithrm, Rechel and Stevenson, U. S. Patent No. 2,194,480 granted March 26, 1940, by utilizing for the red phosphorus referred to therein, red phosphorus treated or prepared according to any of above Examples I(c) to I(n) and II(a) to II(d), inclusive.

We claim:

1. Process for treating red phosphorus of commerce containing up to 700 parts of iron per million parts of phosphorus so as to produce therefrom a red phosphorus-containing composition of increased resistance to oxidation, which comprises agitating the said red phosphorus of commerce with an aqueous solution of a strong acid for removing iron from the said red phosphorus of commerce, maintaining said solution agitating at substantially its boiling point for at least approximately 15 minutes, thereafter washing the resultant phosphorus-containing composition to remove the aqueous solution of acid therefrom, thereafter drying the said resulting phosphorus-containing composition, and retaining the remainder as the red phosphorus product which is more resistant to oxidation than the red phosphorus of commerce employed as the starting material.

2. The process of claim 1 in which the acid used for agitation with the red phosphorus starting material is a boiling aqueous solution of a strong mineral acid.

3. The process of claim 1 in which the acid used for agitation with the red phosphorus starting material is a boiling aqueous solution of sulfuric acid.

4. The process of claim 1 in which the acid used for agitation with the red phosphorus starting material is a boiling aqueous solution of hydrochloric acid.

5. The process of claim 1 in which the acid used for agitation with the red phosphorus starting material is a boiling aqueous solution of nitric acid.

GEORGE F. NORDBLOM.
MARTIN S. SILVERSTEIN.

References Cited in the file of this patent

UNITED STATES PATENTS

| Number | Name | Date |
|---|---|---|
| 157,856 | Milbank | Dec. 15, 1874 |
| 1,984,674 | Fiske et al. | Dec. 18, 1934 |
| 2,050,796 | Kerschbaum et al. | Aug. 11, 1936 |
| 2,359,243 | Pernert | Sept. 26, 1944 |
| 2,537,078 | Miller | Jan. 9, 1951 |
| 2,559,684 | Skolnik | July 10, 1951 |

FOREIGN PATENTS

| Number | Country | Date |
|---|---|---|
| 370,379 | Germany | Mar. 3, 1923 |
| 356,809 | Germany | July 31, 1922 |
| 13,695 | Great Britain | of 1851 |
| 23,380 | Russia | Oct. 31, 1931 |

OTHER REFERENCES

Mellor, "Inorganic and Theoretical Chemistry," vol. 8, pages 743, 745–747. Longmans, Green and Co.